2,939,972

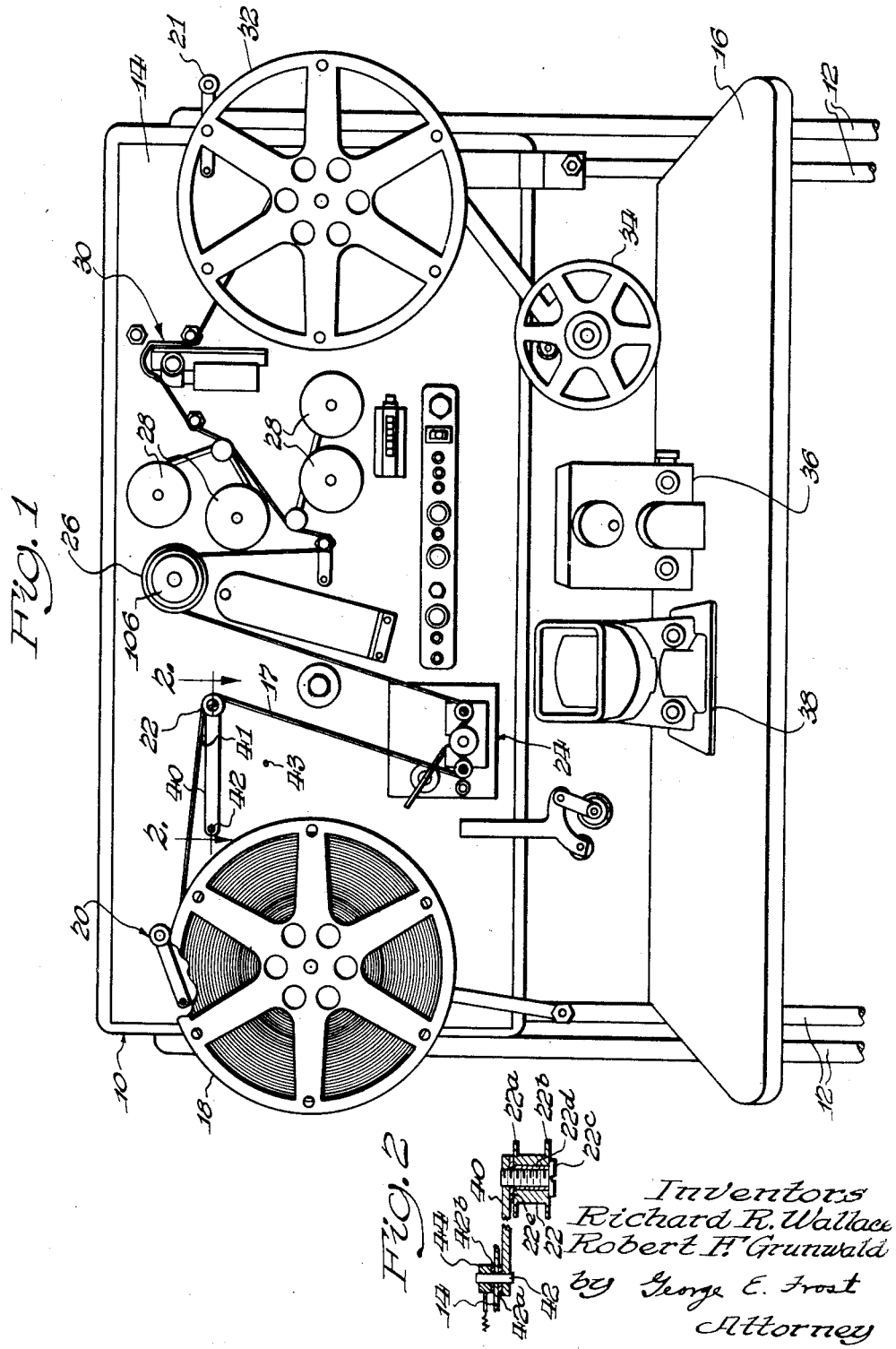

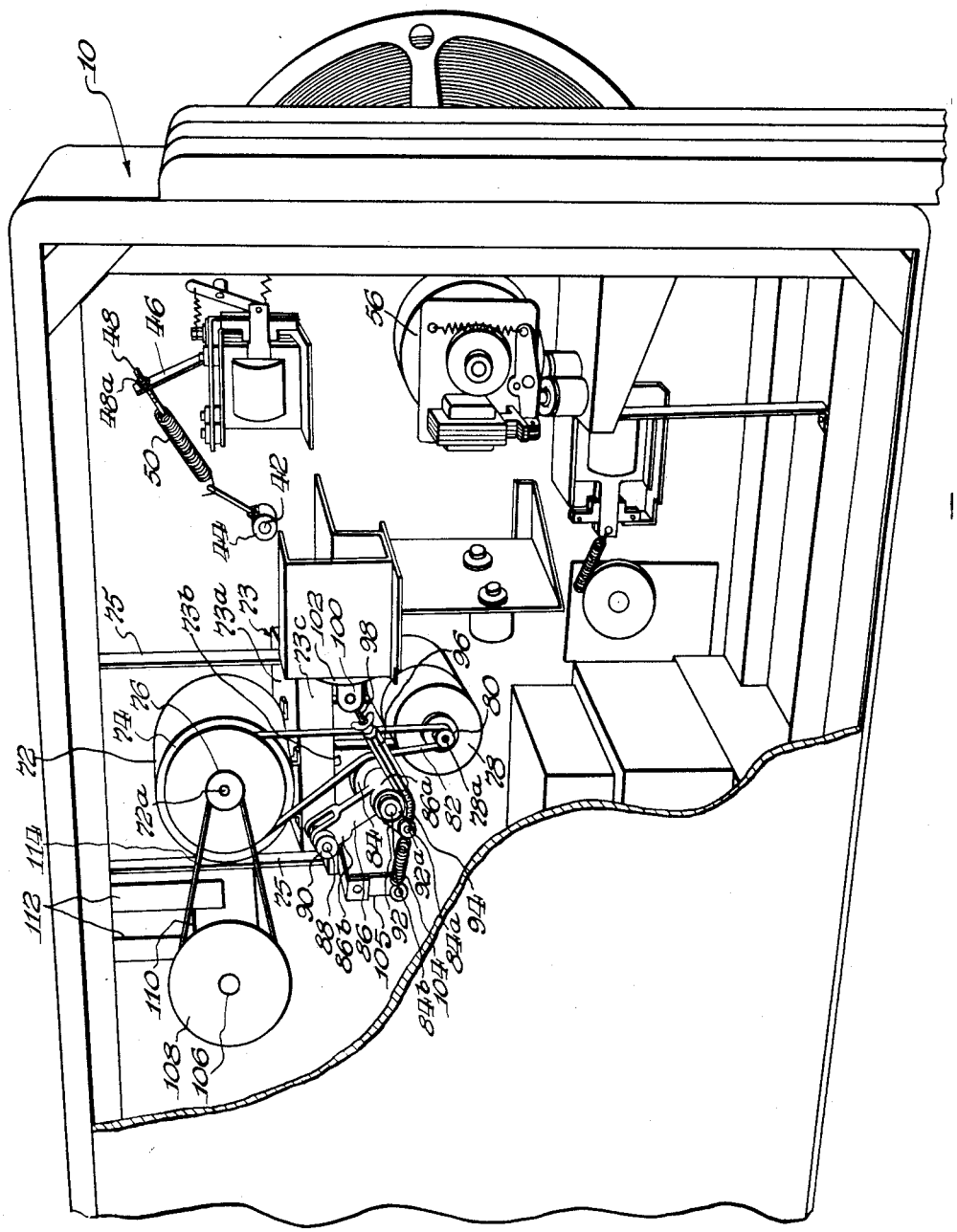

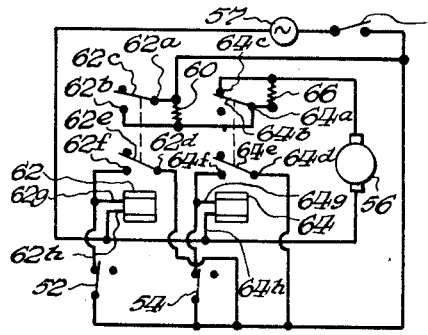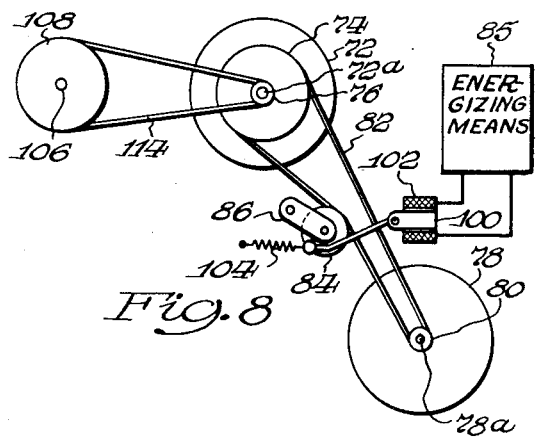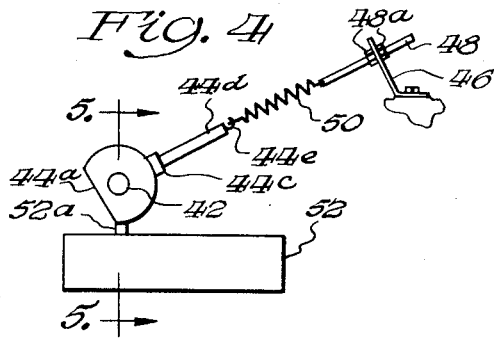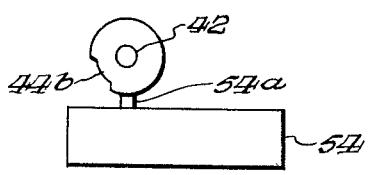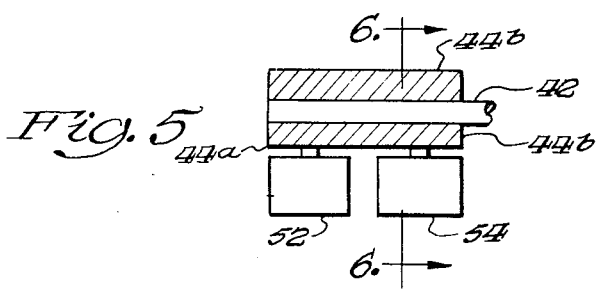
Inventors
Richard R. Wallace
Robert F. Grunwald
by George E. Frost
Attorney

United States Patent Office 2,939,972
Patented June 7, 1960

CONTROL MECHANISM FOR AUTOMATIC FILM INSPECTING DEVICE

Richard R. Wallace, Chicago, and Robert F. Grunwald, Northbrook, Ill., assignors to Harwald Co., Evanston, Ill., a corporation of Illinois Filed June 18, 1956, Ser. No. 591,962

4 Claims. (Cl. 310—112)

The present invention relates to an improved control mechanism for an automatic film inspecting device by which the acceleration and deceleration of the film is governed as it travels through the device.

In the film industry it is customary to inspect a film for defects after its use by an exhibitor. This is done to establish liability of the preceding film user and to assure that the film is in satisfactory condition for the subsequent user. Automatic equipment has been developed for these frequent and necessary inspections by which defects are rapidly and accurately detected. In this equipment film is fed from a pay-out reel, through a series of rollers, to a take-up reel. Various sensing mechanisms are spaced intermediate of the reels in the path of the film and detect the various defects in the film. The sensing mechanisms automatically indicate the defect or stop the film so that repair can be made. Also provision is frequently made to move the film at slow forward speed to reproduce the sound or moving picture simultaneously with inspection.

The film inspecting equipment must be operable to wind the film in either direction and at different speeds. The film may, for example, be driven alternately by a high speed capstan motor, a low speed capstan motor, or, for movement in the reverse direction, from a reel drive or reverse motor. In the normal course of inspecting the film it is desirable that the film travel at a relatively high speed but yet be readily reversible when it is necessary to more closely inspect, or repair, defects detected by the equipment. When the film is driven in the reverse direction it is desirable to attain high speed travel as quickly as possible without snapping the film. With a large number of films to be inspected, it is evident that the speed of the equipment, and the acceleration and deceleration which can be achieved, is of extreme importance to the user.

It is important, in expeditiously checking a film, to be able to bring the film to a rapid stop when it is desired to repair or more closely inspect a detected defect. The film inspecting machine of the present invention is driven in the forward direction, alternatively by a high speed capstan motor or a low speed capstan motor, releasably connected by friction means. At high speed the capstan is driven by the high speed motor independently of the low speed motor. At low speed the capstan is driven by the low speed motor through the high speed motor. When the film is driven at high speed, the low speed motor is used to provide braking action for the high speed motor. This is accomplished by momentarily engaging the friction means between the two motors. A surprisingly rapid deceleration occurs because of the additional moment of inertia introduced into the system, the energy absorbed by the friction means and the low speed drive motor and the relative drive ratio between the capstan, the high speed motor and the low speed drive motor.

Rapid reversal of the film in film inspecting equipment where the film travels at relatively high speed introduces the danger of creating excessive tension in the film, causing breakage. The control mechanism of the present invention permits rapid reversal of the film without creating dangerous tension in the film. In brief, a swingable snubber arm is mounted on the panel carrying the two film reels. At the end opposite its fulcrum the arm has a roller adapted to receive the film at a point between the two film reels. In one extreme position the roller on the swingable arm is spaced from the line between the two adjacent film carrying devices. In the other extreme position, the roller on the swingable arms is closer to the line between the two adjacent film carrying devices. The swingable arm is spring urged towards the first extreme position so that the restoring force at the roller increases more than in proportion to the angular movement of the arm. At its fulcrum the arm is carried by a shaft which receives a dual cam, each portion of which actuates a switch. In operation the film passes from one adjacent film carrying device, over the roller on the swingable arm, to the other adjacent film carrying device.

When the reverse motor is initially energized the film will be slack and, in this condition, will exert no pressure on the roller. With little or no pressure exerted by the film, the roller, under the spring tension, is in the first extreme position farthest from the line between the two adjacent film carrying devices. At this time the torque of the reverse motor is relatively low to drive the film in the reverse direction at relatively low speed and hence prevent whipping and snapping of the slack film. When the slack in the film is taken up pressure is exerted by the film on the roller to swing the arm from its initial extreme position towards the opposite extreme position. This initial movement of the arm serves to actuate, through one portion of the cam, one of the switches to apply full torque to the reverse, or reel drive, motor. With full torque applied to the motor the film is driven at high speed in the reverse direction.

If, under the full torque of the motor, excessive tension is placed on the film additional pressure will be exerted on the roller by the film. This will swing the arm towards the extreme position opposite its initial extreme position. This additional movement of the arm will actuate a second switch, through the second portion of the cam, to again reduce the speed of the motor. This relieves the film of the excessive tension and prevents breakage of the film.

As the swingable snubber arm is moved, by the pressure of the film, from its initial extreme position to the opposite extreme position, the spring force resisting the movement increases greatly. The restoring force, as the arm approaches the opposite extreme position is even greater than an amount proportional to the amount of rotation of the arm. Thus the snubber arm, near its initial position, is relatively sensitive to the pressure of the film. This permits immediate application of the full torque of the reverse motor as soon as the slack in the film is taken up. On the other hand considerably greater force is required to swing the arm as it approaches its opposite position. Thus it is only when dangerous tension is built up in the film that the second switch is actuated to reduce the torque of the motor and hence reduce the speed of the film.

It is therefore a general object of the present invention to provide a control mechanism for an automatic film inspecting device which permits rapid acceleration and rapid deceleration of the film traveling through the device.

It is another object of the present invention to provide a mechanism whereby the slack in the film which develops in an automatic film inspecting device as the film is reversed is taken up at low speed to prevent snapping.

It is still another object of the present invention to provide a mechanism whereby the high speed film travel in an automatic film inspecting device is controlled to prevent excessive shock tension on the film.

It is yet another object of the present invention to provide braking action for film traveling through a film inspecting device by utilizing one of the electric motors of the device.

The novel features which we believe to be characteristic of our invention are set forth with particularity in the appended claims. Our invention itself, however, both as to its organization and method of operation, together with further objects and advantages thereof, will best be understood by reference to the following description taken in conjunction with the accompanying drawings in which:

Figure 1 is a view in perspective of the front of the film inspecting device;

Figure 2 is a view through section 2—2 of Figure 1;

Figure 3 is a view in perspective of the rear of the film inspecting device with parts broken away to show the inside of the housing;

Figure 4 is a view in elevation of the cam actuated by the snubber arm;

Figure 5 is a view through section 5—5 of Figure 4;

Figure 6 is a view through section 6—6 of Figure 5;

Figure 7 is a schematic diagram of the snubber circuit; and Figure 8 is a schematic diagram of the releasable connection between the high speed motor and the low speed motor.

The components of the film inspecting device of the present invention are mounted on and within a housing 10 as shown in Figures 1 and 3. The housing 10 has a front panel 14 upon which is mounted the film receiving mechanism, over which the film 17 travels during the inspecting process, as shown in Figure 1. The housing 10 is supported by legs 12. A table 16 is secured to the legs below the housing in a generally horizontal plane. Mounted on one side of the panel 14 is a pay-out reel 18, and at the opposite side, a take-up reel 32. During the inspecting process the film travels from the pay-out reel 18 through the various film inspecting devices to the take-up reel 32.

As the film 17 leaves the pay-out reel 18 it passes over snubber roller 22 and is then received in the sensing device, shown generally at 24, which automatically detects defects in the film. From the sensing device the film may, if desired, be threaded through the film viewer 38 and the sound reader 36, and then passed to the capstan pulley 26. As shown in Figure 1 the film may, if the viewer and reader are not to be used in the inspection, pass directly to the capstan pulley 26. The film then passes through the cleaner mechanism, shown at 28, to the footage indicator, shown generally at 30. From this latter device, which automatically records the footage passing through the film inspecting device, the film 17 passes to the take-up reel 32. The take-off reel 34 is used in lieu of the take-up reel 32 when it is desired to remove portions of the film. Solenoid actuated external friction brakes, which automatically engage the reels 18 and 32 to check the speed of the film passing through the film inspecting device, are shown respectively at 20 and 21.

The snubber device, which serves to control the tension of the film as the film is reversed, is located adjacent to feed reel 18 on the front panel 14 as shown in Figure 1. As shown in Figure 2 the snubber device consists of an arm 40 which is pivotally carried by the front panel 14. Pin 42 which is non-rotatably received in a hole at one end of the arm 40 is rotatably received in a hole in the panel 14. A washer 42a is interposed between the arm 40 and the panel 14. The pin 42, at the opposite end, non-rotatably receives a cam 44 inside the housing as shown in Figures 2 and 3. Washer 42b is interposed between the cam and the back of the front panel 14. The arm 40, at the end opposite the pin 42, carries a rotatable roller 22, adapted to receive the film 17. The roller 22 has an inner-flange 22a and an outer-flange 22b, between which the film rides. A centrally disposed axial hole through the roller receives a bearing sleeve 22d. A screw 22c is received in the bearing sleeve 22d and threadedly engages arm 40. A washer 22e is carried on the screw between the rotatable roller 22 and the arm 40. The cam 44, which is non-rotatably received on the pivot pin 42 inside the housing, has a boss 44c protruding from its surface as shown in Figure 4. The boss threadedly receives rod 44d which extends radially outward from the axis of the cam. The rod 44d has a hook 44e at its outer end which connects to a hook on the end of spring 50. Spring 50, at the opposite end, connects to rod 48. Rod 48 passes through a hole in member 46 and is held in fixed position in relation to member 46 by nuts 48a, threadedly engaged on rod 48 on each side of member 46 as shown in Figure 3. Member 46 is rigidly held in fixed position by connection to some suitable non-movable unit in the housing, or to the housing itself.

The cam 44 has two camming surfaces, 44a and 44b, as shown in Figures 4 and 6. The cam 44 engages switches 52 and 54. The switch 52 is actuated by rotation of camming surface 44a which engages and releases switch plunger 52a. The switch 54 is actuated by the rotation of the camming surface 44b which engages and releases plunger 54a.

The snubber arm 40 is swingable between the pins 41 and 43 mounted on the front panel 14 as shown in Figure 1. As the arm 40 swings between the two extreme positions defined by pins 41 and 43, the cam 44 will rotate on its axis. With the initial downward movement of the arm 40 from its extreme position against pin 41, the camming surface 44a will rotate to release switch plunger 52a. After the arm 40 has been swung through approximately two-thirds of the arc defined by pins 41 and 43 camming surface 44b will be rotated to release the plunger 54a on switch 54. The spring 50, connected to the cam 44, serves to urge the arm 40 to its upward extreme position against the pin 41. As the arm 40 rotates from this upward extreme position the cam 44 also rotates and the tension in the spring 50 is increased. Since the cam 44 is connected to the spring 50 at a point spaced from the axis of the cam the tension in the spring 50 will increase more than in proportion to the angular movement of the arm and cam.

The drive motor 56 for the pay-out reel 18 which is the reverse motor is mounted within the housing 10, as shown in Figure 3, and is connected directly to the pay-out reel 18 to drive that reel in the take-up direction.

The circuit for the snubber mechanism is shown in Figure 7. The single throw single pole "reverse-stop" switch 59 is connected in series with a source of alternating voltage 57. A relay 62 has one terminal 62h connected to one side of source 57 and the other terminal 62g connected through switch 52 to the other side of source 57. Relay 62 has two switch elements 62c and 62e, the former for connection of the normally open contacts 62a and 62b and the latter for connection of the normally open contacts 62d and 62f. A second relay 64 also has one terminal 64h connected to one side of the source 57 and a second terminal 64g connected through switch 54 to the other side of the source. Relay 64 also has two switch elements 64c and 64e, the former for connection of normally closed contacts 64a and 64c and the latter for connection of the normally open contacts 64d and 64f.

Contact 62f is connected to terminal 62g of relay 62 and contact 62d is connected to the opposite side of the source from terminal 62h to provide for sealing in relay 62 after 62f and 62d have been connected. Similarly contact 64f is connected to terminal 64g of relay 64 and contact 64d is connected to the opposite side of source 57 from the terminal 64h to provide for sealing in relay 64 after contacts 64d and 64f are connected.

The normally open switch element 62c of relay 62, upon energization of relay 62, connects contacts 62a and 62b. Contact 62a is connected to one side of source 57 and contact 62b is connected to contact 64a. Resistance 60 is connected across contacts 62a and 62b. The normally closed switch element 64b of relay 64 connects contact 64a with 64c when relay 64 is deenergized. The latter contact is connected to reverse motor 56 which is also connected to the side of source 57 opposite the connection of contact 62a. Resistance 66 is connected across contacts 64a and 64c.

The film inspecting device of the present invention has two motors to drive the film from the pay-out reel 18 to the take-up reel 32, a high speed capstan drive motor 72 and a low speed capstan motor 78. As shown in Figure 3, these motors are mounted inside the housing 10. The high speed motor 72 is mounted on the upper surface of a platform 73 having an upper surface 73a, a lower surface 73b, and a side 73c opposite the front panel 14. The motor 72 is connected to the upper surface 73a by bolts or other suitable means. The platform 73 is connected to the back of the front panel 14 at one end and is sustained at the other end by support members 75. The low speed motor 78 is suspended underneath the platform 73 and attached thereto by suitable braces. The shaft 72a of the high speed motor 72 extends from the motor at the end opposite the front panel 14. Two pulleys 74 and 76 are non-rotatably carried on the extending shaft 72a. Pulley 74 is comparatively large and receives a friction belt 82 which connects with a pulley on the low speed motor 78. Pulley 76 is comparatively small and receives friction belt 114 which connects to a pulley 108 on the capstan 106. The friction belt 82 is received on the relatively small pulley 80 which is non-rotatably carried on shaft 78a of motor 78. The continuous belt 82 is of sufficient length to be slidable on pulleys 74 and 80 when the clutch pulley 84, hereinafter described, is disengaged.

The capstan 106, which extends through the panel 14 and carries capstan pulley 26, is supported in the housing by bearing 110. The bearing 110 is sustained within the housing by supporting braces 112 as shown in Figure 3. At the end opposite the front panel 14 the capstan 106 carries a relatively large pulley 108. This pulley receives the friction belt 114 which is connected to the high speed capstan drive motor 72.

A clutch pulley 84 is swingably mounted to alternately engage and disengage the friction belt 82. When the clutch pulley 84 is engaged with belt 82, the belt is sufficiently tightened so that it is in non-sliding engagement with pulleys 74 and 80. The pulley arm 86 which carries the clutch pulley 84 has, at one end, a cylindrical section 86a with its axis perpendicular to the longitudinal axis of the arm. The pulley 84 is received on a pin 84b which passes through the cylindrical section 86a of the arm. A collar 84a is snugly received on the end of pin 84b opposite the clutch pulley. At its opposite end the clutch pulley arm has a clevis portion 86b which is pivotally received on shaft 88 which extends normally from the platform side 73c. Two nuts (not shown) threadedly carried on shaft 88, one on each side of platform side 73c, hold the shaft rigidly in position. The shaft 88 carries a spacer (not shown) between the clevis 86b and the nut of sufficient length to assure proper alignment of the clutch pulley with the friction belt 82. Outboard of the clevis the shaft 88 carries a collar 90 affixed by a set screw to the shaft.

The engagement of the clutch roller 84 with the friction belt 82 is achieved by means of solenoid 102 which is selectively energized by some suitable energizing means 85. The solenoid has a plunger 100 which is pivotally connected at one end to rod 98. The rod 98 is threadedly received in turnbuckle 96. At the opposite end the turnbuckle threadedly receives pin 94 which in turn is connected by bolt 92a to a lug 92 welded to the underside of the cylindrical portion 86a of arm 86. Spring 104, connected at one end to bolt 92a and at the other end to suitable supporting structure 105 urges the pulley into the disengaged position. The energization of solenoid 102 swings the clutch pulley arm 86 to pull the clutch pulley 84 into engagement with the friction belt 82.

The capstan 106 is driven at high speed by the high speed motor 72 through the step-down drive comprising pulley 76, belt 114, and pulley 108, as shown best in Figure 8. During the high speed drive clutch roller 84 is out of engagement with belt 82 and high speed motor 72 is consequently disengaged from the deenergized low speed motor 78. During low speed drive, the clutch roller 84 is brought into engagement with belt 82 and the low speed motor 78 drives the deenergized high speed motor 72 through the step-down drive comprising pulley 80, belt 82, and pulley 74. The driven high speed motor 72 in turn drives capstan 106 in the same manner as it does when independent of the low speed motor.

In operation, the low speed motor 78 functions as a braking means to decelerate the high speed motor 72. When the film is driven at high speed by motor 72, the clutch pulley 84 is disengaged from the belt 82, which is slideably carried on pulleys 74 and 80, and the motor 72 is disengaged from the low speed motor 78. When braking action on the high speed motor is desired the solenoid 102 is energized by the energizing means 85. Plunger 100 is retracted into the solenoid to swing the clutch pulley 84 into engagement with belt 82 and tighten that belt on pulleys 74 and 80. Thus the energized high speed motor 72 is engaged with the deenergized motor 78. The sudden drag of motor 78, together with the friction losses associated with the clutch pulley and friction belt, and the relative drive ratios of the two motors, causes the high speed motor 72 to come to a sudden stop.

In the operation of the snubbing device, the mechanism automatically responds to tension on the film to provide for slow speed take up of slack and thus prevent the whipping and snapping of the film which produces breakage. The device further automatically provides for high speed travel after the slack has been taken up but, if tension should build up excessively at the high speed, the device will automatically reduce the speed of the film and thereby eliminate the excessive tension and prevent breakage.

The reverse motor 56 is energized by closing the "reverse-stop" switch 59. At this time there will be slack in the film 17 and hence no pressure will be exerted on the snubber roller 22. The arm 40 will be held in the first extreme position against pin 41 by spring 50 and both cam operated switches 52 and 54 will be open. The reverse motor 56 will be energized from source 57 through a circuit containing resistance 60. With resistance 60 in the circuit the torque of motor 56 is relatively low and the slack in the film is taken up at a relatively slow, safe, speed.

After the slack in the film has been taken up at the relatively slow speed, the film will exert pressure on the snubber roller 22. Since the snubber arm is relatively sensitive to pressure during its initial movement because the spring 50 is connected to the snubber mechanism at a point spaced from its action of rotation, the arm 40 will swing downward away from the first extreme position as soon as the film exerts pressure on the roller 22. This will rotate the cam portion 44a to release plunger 52a and close switch 52.

When switch 52 closes the relay 62 is connected to the source 57 and is thereby energized. This connects contacts 62a and 62b as well as contacts 62d and 62f. With contacts 62d and 62f connected the relay 62 is connected across the source 57 independently of the circuit containing switch 52 so the relay will remain energized until switch 59 is subsequently opened. With contacts 62a and 62b connected, resistance 60 is shorted out of the circuit and the motor 56 develops a relatively high torque, to drive the film at high speed.

If, at this relatively high speed excessive tension builds up in the film, additional pressure will be exerted on the roller 22 to urge the arm 40 towards the extreme position adjacent stop pin 43. It will be noted that because of the manner of connecting spring 50 to the snubber arm and cam assembly considerably more force is required to move the arm in the latter part of its arc between pin 41 and 43. Thus it requires considerable pressure on the roller 22—pressure which is exerted only as excessive tension is built up in the film—to rotate the arm 40, and hence the cam surface 44b, to the point where the plunger 54a is released.

The release of plunger 54a closes switch 54 to energize relay 64. This actuates the switch elements to connect contacts 64d and 64f as well as disconnect contacts 64a and 64c. With contacts 64d and 64f connected the relay 64 is connected across source 57 independently of switch 54 to keep the relay energized until the opening of switch 59. As contacts 64a and 64c are disconnected, the resistance 66 is introduced into the circuit through which motor 56 is energized from source 57. This reduces the torque of the motor 56 and consequently reduces the excessive tension in the film.

Thus means are provided by which film may, for example, be reversed from high speed travel in one direction to high speed travel in the opposite direction. The engagement of the deenergized low speed motor with the energized high speed motor will rapidly check the travel of the film. This braking mechanism can be coordinated with other braking means, such as friction brakes 20 and 21. The snubbing device permits the attainment of high speed reverse travel quickly while, at the same time, automatically providing for the taking up of slack without snapping the film and automatically guarding against excessive tension being built up in the film. The entire change from high speed operation in one direction to high speed operation in the other direction is accomplished quickly without breakage in the film.

While we have shown and described a specific embodiment of the present invention, it will, of course, be understood that many modifications and alternative constructions may be made without departing from the true spirit and scope thereof.

What we claim as new and desire to secure by Letters Patent of the United States is:

1. In a film inspecting device wherein a capstan is rotated to drive film over a sensing device and in which the capstan must be rapidly decelerated to a stop after high speed rotation, the improvement comprising: an electric high speed capstan drive motor; a relatively large pulley rotated by the high speed motor; means to drive the capstan from said motor; a slow speed electric capstan drive motor; a relatively small pulley rotated by the low speed motor; a friction belt slidably carried on said pulleys; a clutch roller engageable with said friction belt to tighten the same for non-sliding engagement with the pulleys; electrically operated means to engage said clutch roller with the friction belt when the low speed motor is energized to drive the capstan through the high speed motor; electrically operated means to release said clutch roller from engagement with the belt when the high speed motor is energized to drive the capstan; and electrically operated means to engage the clutch roller with the friction belt when the high speed motor is de-energized to bring the capstan to a rapid stop.

2. In a film inspecting device wherein a capstan is rotated to drive film over a sensing device and in which the capstan must be rapidly decelerated to a stop after high speed rotation, the improvement comprising: a high speed capstan drive motor; means to drive the capstan from said motor; a slow speed capstan drive motor; friction means to drive the high speed motor at a relatively low drive ratio from the low speed motor, thereby to drive the capstan at low speed; a third means to engage and release said friction means; and means to operate said third means momentarily when said high speed motor is deenergized to bring the capstan to a rapid stop.

3. In a film inspecting device wherein a capstan is rotated to drive film over a sensing device and in which the capstan must be rapidly decelerated to a stop after high speed rotation, the improvement comprising: a capstan drive motor; means to alternately drive the capstan from said motor; a second capstan drive motor; means to alternately drive the capstan from said second drive motor; friction means to drive said second capstan motor at a relatively high drive ratio from said first capstan motor; a fourth means to alternately engage and release said friction means; and means to operate said fourth means to bring the capstan to a rapid stop.

4. A film inspecting device having in combination: a capstan; a high speed motor operatively connected to said capstan; a slow speed motor; means including a clutch and a step-down drive from said capstan to said slow-speed motor operatively connecting said slow-speed motor to said capstan; and operating means to energize and de-energize said high-speed motor with said low-speed motor de-energized and to engage said clutch at the time said high-speed motor is de-energized whereby said deenergized low-speed motor will act as a brake to rapidly bring said capstan to a stop when said high speed motor is de-energized.

References Cited in the file of this patent

UNITED STATES PATENTS

| | | |
|---|---|---|
| 2,461,659 | Rouse | Feb. 15, 1949 |
| 2,498,336 | Kennedy | Feb. 21, 1950 |
| 2,666,863 | Davis | Jan. 19, 1954 |
| 2,750,128 | Hittle | June 12, 1956 |